Aug. 30, 1960 G. C. TERRY 2,950,711
AIR INTAKE DEVICE FOR CHARCOAL GRILLS
Filed Oct. 15, 1957

INVENTOR.
GEORGE C. TERRY
BY John P. Chandler
HIS ATTORNEY.

United States Patent Office 2,950,711
Patented Aug. 30, 1960

2,950,711

AIR INTAKE DEVICE FOR CHARCOAL GRILLS

George C. Terry, Garden City, N.Y., assignor to Kamkap, Inc., New York, N.Y., a corporation of New York Filed Oct. 15, 1957, Ser. No. 690,374

1 Claim. (Cl. 126—25)

This invention relates to charcoal grills and relates more particularly to an improved grill with a combined air intake, with a closure therefor, and clean-out device for the ashes which remain after the fire is spent.

The improved arrangement of the present invention has special reference to the brazier type of grill with its circular concave fire box although it is equally applicable to other grills with a square or rectangular fire box.

Those who indulge in outdoor cooking appreciate the problems of getting a mass of charcoal ignited to a point where it is feasible to commence the cooking. Various types of igniters have been proposed and also a blower has been used to direct air to the burning mass to speed up the combustion. The latter has not been satisfactory for the reason that the fuel is too quickly consumed even before the cooking starts.

It has been found that best results are obtained if a supply of air, not under pressure, is made available to the charcoal during its ignition period, providing that means are available for shutting off the air supply after the cooking gets under way, for otherwise the charcoal burns entirely too fast. In other words, if the fire box consists of a perforated or wire mesh basket the ignition and early burning takes place satisfactorily but the burning continues at too rapid a rate after cooking temperature has been achieved.

In accordance with the present invention as applied to a brazier type of grill, the fire box is stamped in a single piece from sheet metal with a concave burning area and an upstanding annular flange surrounding this area. The burning area is formed in its center section with a plurality of openings of such size as to form a healthy unforced air supply which encourages initial combustion. These holes are arranged to be closed at a desired time by a vertically movable concave closure plate which engages the lower convex surface of the fire box in the area of the openings in air sealing relation.

This arrangement allows the fire to be controlled during the cooking period and after the charcoal is spent the closure may be lowered to a fixed position several inches under the fire box and the ashes scraped through the openings and onto the closure plate. This latter is now removed from its supporting means such as a ring at the end of a pivoted lever, the ashes dumped into a receptacle and the plate returned to its support.

Figure 1:
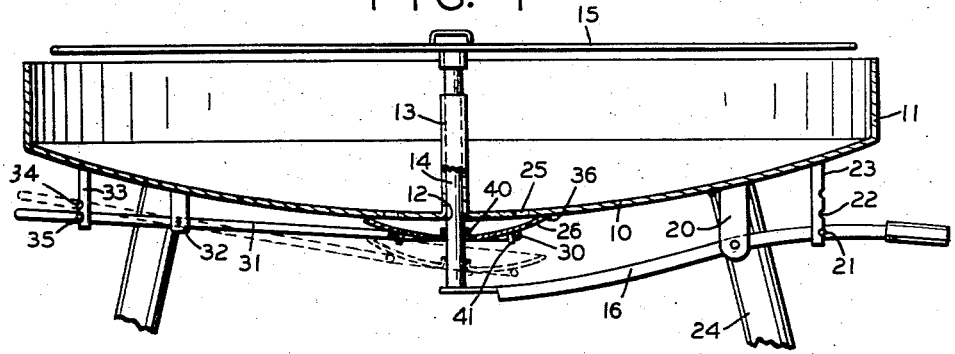
Fig. 1 is a central section taken through a grill embodying the present invention.

In Fig. 1 there is illustrated a brazier type of charcoal grill having a concave fire box or bowl 10 with an upstanding vertical annular flange 11. The fire box may be stamped in a single piece from sheet metal and is provided with a central opening 12 to the edges of which is secured an upwardly extending vertical sleeve 13 which receives a center post 14 in sliding relation. A grid 15 for the meat or other food to be broiled is secured at the upper end of the post and the grid is movable vertically to an adjusted fixed position by means of a lever 16 pivoted on a bracket 20. A pin 21 on the lever is received in one of a plurality of notches 22 in a second vertical bracket 23 secured to the lower face of the bowl. Legs 24 support the bowl. The foregoing is largely conventional.

The central area of the fire box is provided with a plurality of air intake openings 25 and these openings are arranged to be closed by means of a concave closure plate 26 mounted on a ring portion 30 of a lever 31 formed of wire and pivoted on a bracket 32. Another bracket 33 has notches 34 to receive a pin 35 to secure the lever in two positions, i.e., open and closed. The lever and its ring are so proportioned that the upper peripheral edge 36 of the closure plate engages the lower spherical surface of the fire box with a measure of compression. The diameter of the closure plate is sufficiently large to include all the openings 25 within its area. The plate has a central opening which has an upwardly turned annular flange 40 which prevents ashes or grease from the bowl from falling on the floor on which the grill is supported. Struck-out tabs 41 center the plate on its supporting ring.

The opening in central flange 40 is only slightly larger than the diameter of the center post so that the grid may be freely movable vertically. When the plate is in the closed position of Fig. 1 a slight amount of air may pass upwardly through this annular opening. The closure plate has a shorter radius of curvature than does the bottom of the bowl forming a pocket to receive ashes during the cooking operation. After the cooking the remaining ashes may be scraped to the openings through which they fall onto the plate.

Figure 4:
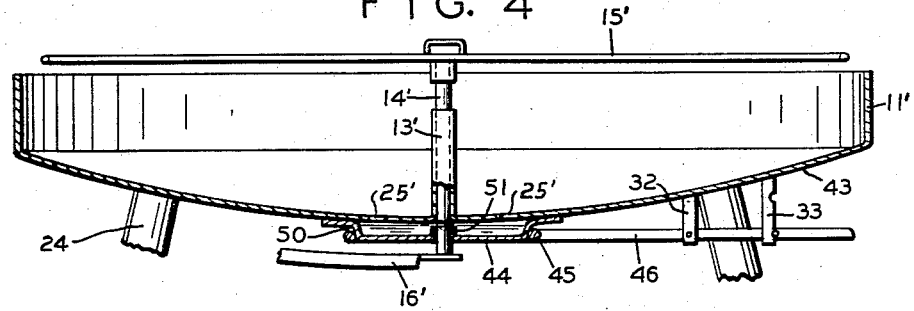
Fig. 4 is a section taken through a modified arrangement.
Figure 3:
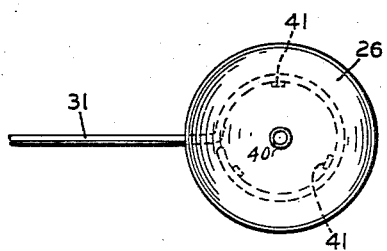
Fig. 3 is a top plan view thereof.
Figure 2:
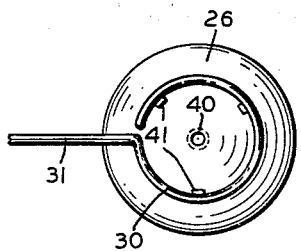
Fig. 2 is a bottom plan view of the plate forming the closure member and its supporting frame formed of wire.

In the modified arrangement of Fig. 4 the fire box 43 is substantially the same as in Fig. 1 and has the annular flange 11', the vertical sleeve 13', the center post 14', the grid 15', the lever 16' for supporting the center post and the openings 25' in the fire box. In this instance, however, the closure plate 44 is constructed differently so as to eliminate the struck-out tabs used to center the plate on the ring 45 formed at the inner end of lever 46. The plate is so stamped as to form a lower collar 50 which receives the ring and it is provided with the same central annular flange 51.

It will be noted that the central section of the fire box 43 is more nearly flat than is fire box 10 which also illustrates how the present invention is applicable to a square or rectangular broiler with a flat lower wall.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

A charcoal grill provided with a fire box which is convex on its lower surface and having a plurality of air intake openings in its central section, and a substantially imperforate closure plate which is concave on its upper surface which is movable upwardly to cause its peripheral edge, which is of a diameter to encircle said air intake openings, to engage the lower surface of the fire-box and effectively close the fire box opening, the plate having a shorter radius of curvature than the lower surface of the fire box and forms an ash receptacle, a pivoted lever provided with a ring at its inner end to receive and support the closure plate, and means for securing the lever in an upper position where the closure plate engages said lower surface and also in a lower position wherein the plate can be removed from its support, the lever being so proportioned as to cause the closure plate to engage said lower surface with a measure of compression.

References Cited in the file of this patent

UNITED STATES PATENTS

| | | |
|---|---|---|
| 81,163 | Hale | Aug. 18, 1868 |
| 355,208 | Rew | Dec. 28, 1886 |
| 1,189,366 | Kimberlin | July 4, 1916 |
| 1,769,149 | Luther | July 1, 1930 |
| 2,120,683 | Simmons | June 14, 1938 |
| 2,786,463 | Vincent | Mar. 26, 1957 |
| 2,787,995 | Alter | Apr. 9, 1957 |
| 2,820,446 | Freeman | Jan. 21, 1958 |
| 2,860,570 | Broome | Nov. 18, 1958 |
| 2,860,624 | Eddy | Nov. 18, 1958 |

FOREIGN PATENTS

| | | |
|---|---|---|
| 872,688 | France | Feb. 23, 1942 |